(12) United States Patent
Mon et al.

(10) Patent No.: US 8,175,970 B1
(45) Date of Patent: May 8, 2012

(54) CASH TO CARD RECYCLING

(75) Inventors: Felix A. Mon, Jacksonville, FL (US);
Todd A. Atwood, Charlotte, NC (US);
Shane A. Johnson, Charlotte, NC (US);
Michelle Nichols, Fort Mill, SC (US)

(73) Assignee: Bank of America Corporation,
Charlotte, NC (US)

( * ) Notice: Subject to any disclaimer, the term of this patent is extended or adjusted under 35 U.S.C. 154(b) by 34 days.

(21) Appl. No.: 12/099,832

(22) Filed: Apr. 9, 2008

(51) Int. Cl.
*G06Q 40/00* (2012.01)

(52) U.S. Cl. .......................................... 705/40; 705/35
(58) Field of Classification Search .................... 705/44, 705/40, 43; 235/379
See application file for complete search history.

(56) References Cited

U.S. PATENT DOCUMENTS

| | | | |
|---|---|---|---|
| 2001/0020638 A1* | 9/2001 | Uematsu et al. | 235/379 |
| 2004/0200690 A1* | 10/2004 | Adams et al. | 194/302 |
| 2005/0045714 A1* | 3/2005 | Hermanussen | 235/379 |
| 2005/0131824 A1 | 6/2005 | Drummond et al. | |
| 2007/0100750 A1* | 5/2007 | Hartfield et al. | 705/43 |
| 2008/0296366 A1 | 12/2008 | Schoeffler et al. | |
| 2009/0018959 A1* | 1/2009 | Doran et al. | 705/44 |
| 2011/0089231 A1 | 4/2011 | Artino et al. | |

OTHER PUBLICATIONS

M2 Presswire, "DIEBOLD: Diebold Installs 250th Bulk Cash Deposit Machine at HSBC UK," Dec. 14, 2006, p. 1.*
Valentine, "Self-serve Coin Counters Are All the Rage," Mar. 2007, American Bankers Association, ABA Banking Journal, vol. 99, Issue 3, p. 7.*
Non-final office action for U.S. Appl. No. 12/277,977 mailed Nov. 24, 2010.
Office action for U.S. Appl. No. 12/277,977 mailed Oct. 11, 2011.
Final office action for U.S. Appl. No. 12/277,977 mailed May 10, 2011.

* cited by examiner

*Primary Examiner* — Samica L Norman
(74) *Attorney, Agent, or Firm* — Banner & Witcoff, Ltd; Michael A. Springs

(57) ABSTRACT

An end-to-end currency handling and management system and method include a recycler system configured to receive currency, deposit the currency into a desired account and make the currency immediately available. The currency may, in one or more examples, belong to an employee at a business. In such instances, the recycler system may be configured to deposit the currency into an account, such as a pre-paid cash card account, designated by the employee. This allows an employee to avoid carrying large amounts of cash which may lead to loss or theft. At the same time, the deposited currency would be available for use by the business for conducting other transactions.

18 Claims, 10 Drawing Sheets

```
Money Recycler

Welcome to DEVICE @ NAME OF BUSINESS/
              ORGANIZATION

Please Login                    800a

Account or User ID:
   ┌─────────────────────┐
   │        801          │
   └─────────────────────┘
   PIN/Security Code:
   ┌─────────────────────┐
   │                     │
   └─────────────────────┘
```

FIG. 8A

```
Money Recycler

┌─────────────────────────┐
│ Welcome, FIRST NAME,    │ ─ 810
│    LAST NAME            │
│ Employee ID: XXXXX      │                800b
└─────────────────────────┘

PLEASE INSERT MONEY

┌──────────────────────┐
         │    $27.00      805   │
         └──────────────────────┘

815
   ┌──────────┐           ┌──────────┐
   │  CANCEL  │           │ COMPLETE │
   └──────────┘           └──────────┘
```

FIG. 8B

CASH TO CARD RECYCLING

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

While cash recyclers allow a business to manage their cash flows in a more seamless manner, recyclers are often unable to reconcile the cash flows with individual employee accounts. Thus, employees of a business must typically withdraw their tips or other take-home income in the form of cash at the end of their shift. In some instances, tips or other income may amount to a significant sum, making the employee a more attractive target for robbery and theft. Furthermore, displaced cash is less easily recovered than with other forms of payments (e.g., debit card, pre-paid card, or mobility devices).

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, an end-to-end currency handling and servicing apparatus is provided to any cash-centric business or enterprise. In various embodiments, the method, apparatus, and system may provide cash register till set up and balancing, back office reconciliation, and other cash payment handling activities. Currency recycling systems may be placed in a business location in, e.g., a back office area and may be networked with one or more systems in the business or with remote computers such as a banking system. Additionally or alternatively, a cash recycling apparatus may be configured to receive currency deposits and recycle the deposited currency for withdrawals. In one embodiment, the cash recycling apparatus may scan each deposit for counterfeit bills.

Furthermore, according to another aspect, cash deposited into a recycler system may be transferred or deposited into a depositing user's account. For example, a retail employee may deposit her tips into the recycler system and have the tips transferred onto a pre-paid card, a debit card, a mobility device, or another payment device so that she does not need to carry large sums of cash. The deposited currency may also then be recycled and made available for other transactions at the retail site. Deposited currency may be deposited into a savings or checking account, a debit card, a pre-paid card and other payment accounts. Alternatively or additionally, deposited currency may be used to pay one or more bills such as student loans, utilities bills and the like.

BRIEF DESCRIPTION OF THE DRAWINGS

The present disclosure is illustrated by way of example and not limited in the accompanying figures in which like reference numerals indicate similar elements.

FIGS. 8A-D illustrate sample user interfaces through which a user may insert and deposit funds to one or more accounts according to one or more aspects described herein.

DETAILED DESCRIPTION

In accordance with various aspects of the disclosure, systems and methods are illustrated for providing currency handling services and management. A financial institution such as a bank may provide immediate access and use of funds recently deposited using the currency handling apparatus, system, and method described below. For illustrative purposes the financial instrument discussed throughout the below description is cash. However, as those skilled in the art will realize, the described aspects of the invention are not limited to just cash (paper money and coins) and but may also include other forms of liquid assets such as checks, bank notes, and money orders.

Figure 1:
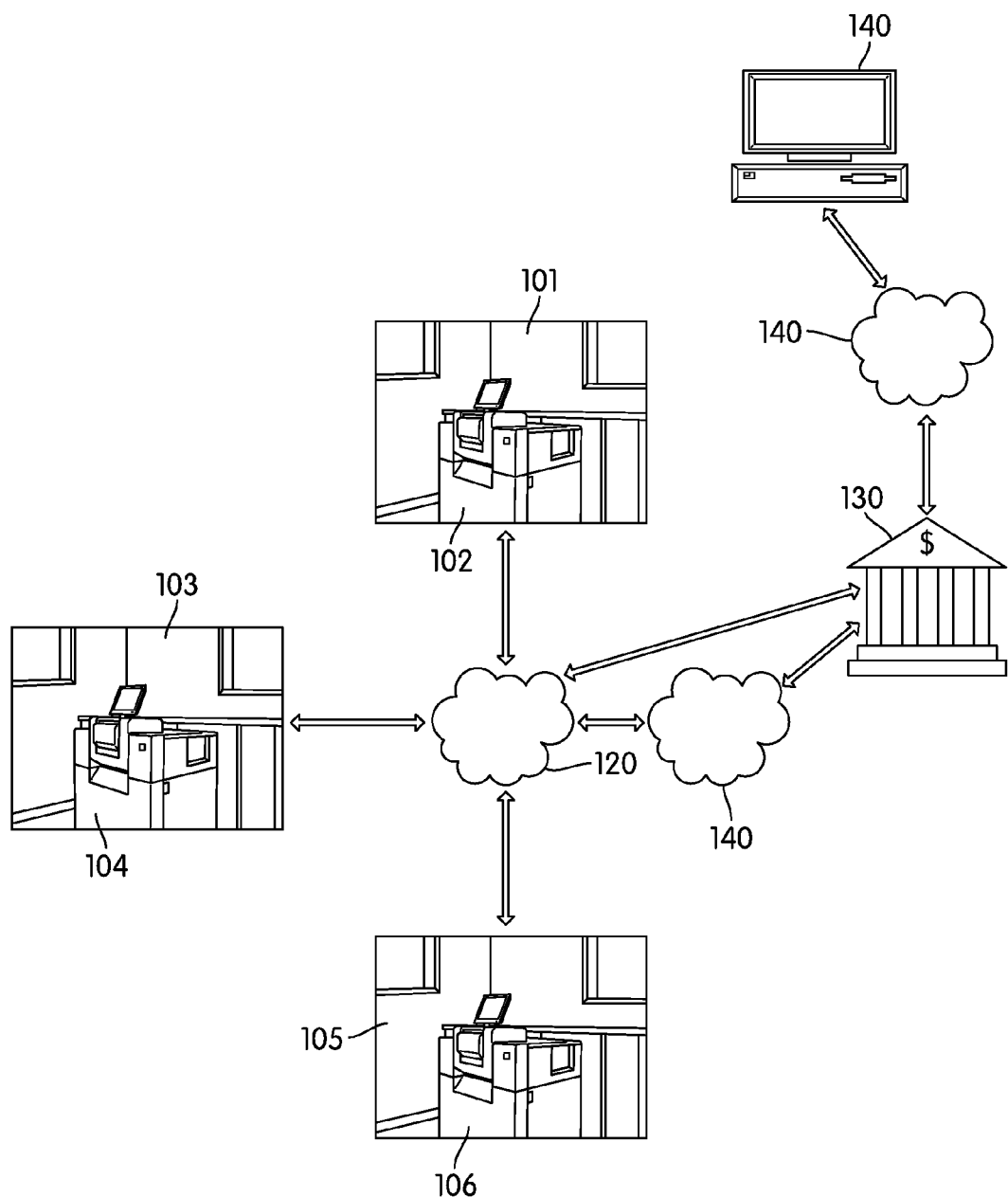
FIG. 1 illustrates an example of a suitable operating environment in which various aspects of the disclosure may be implemented.

FIG. 1 illustrates an example of a suitable operating environment in which various aspects of the disclosure may be implemented. Currency or cash recyclers 102, 104, 106 may be located at various locations such as locations 101, 103, and 105. The locations may represent different stores of a business enterprise. For example, locations 101, 103, and 105 may represent three different grocery stores located in different geographical areas belonging to a grocery chain. Those skilled in the art will realize that additional cash recyclers may be located in same stores or in other stores belonging to the grocery chain. In addition, those skilled in the art will realize that a grocery chain is only one illustrative example of the types of locations that cash recyclers may be located. For example, cash recyclers may also be located in gas stations, post offices, department stores, restaurants and other places where cash and other financial instruments are deposited or withdrawn.

FIG. 1 further illustrates that cash recyclers 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash recyclers 102, 104, and 106 may communicate with one another or with a financial institution such as bank 130 via communication network 120 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 such as the STAR network before being connected to bank 130.

Figure 2:
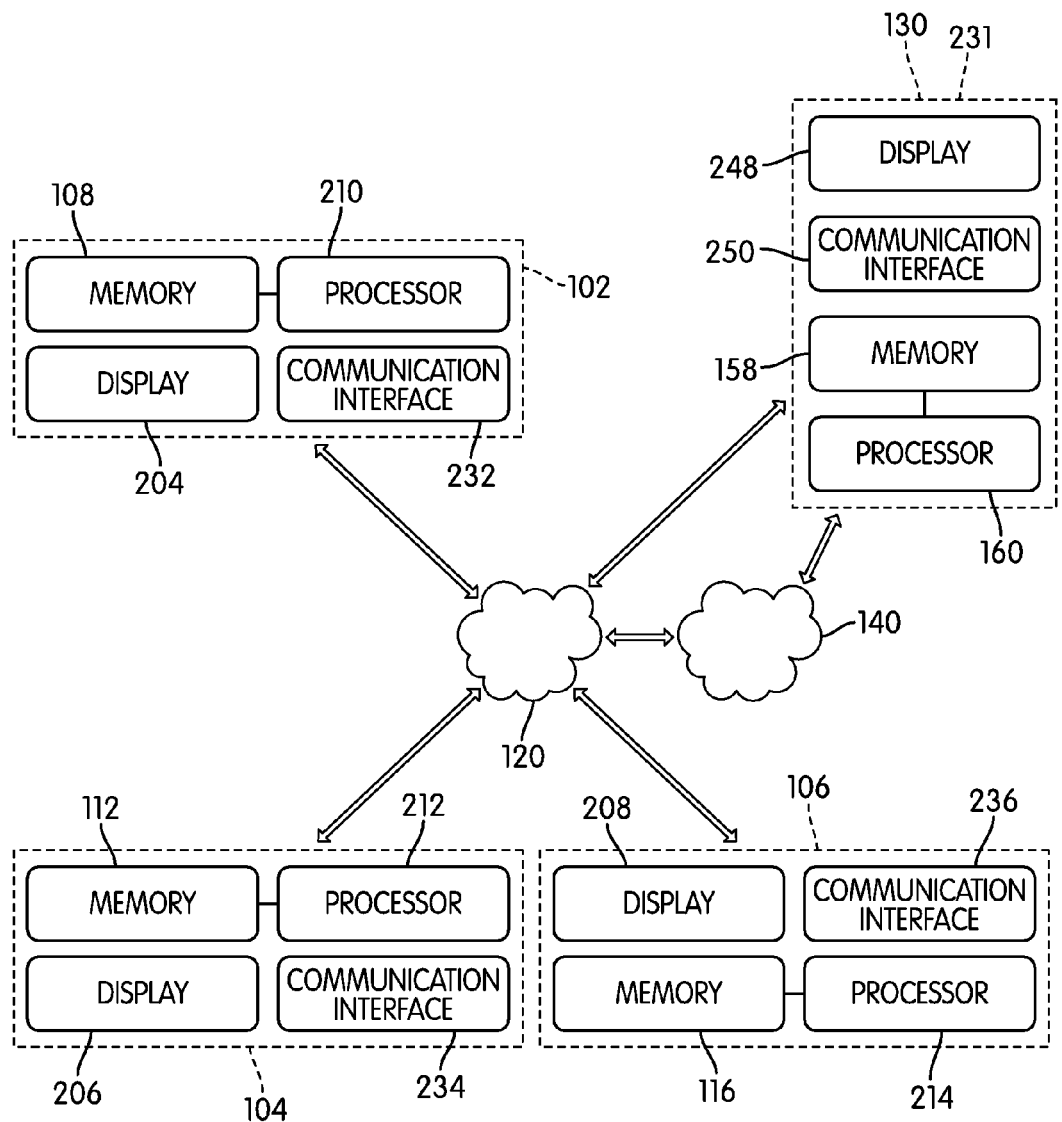
FIG. 2 illustrates a simplified diagram of a currency recycler in accordance with an aspect of the invention.

FIG. 2 illustrates a simplified diagram of a cash recycler in accordance with an aspect of the invention. Cash recyclers may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, the cash recyclers 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the cash recyclers 102, 104, and 106 and server 231 may include non-volatile and/or volatile memory.

Figure 3:
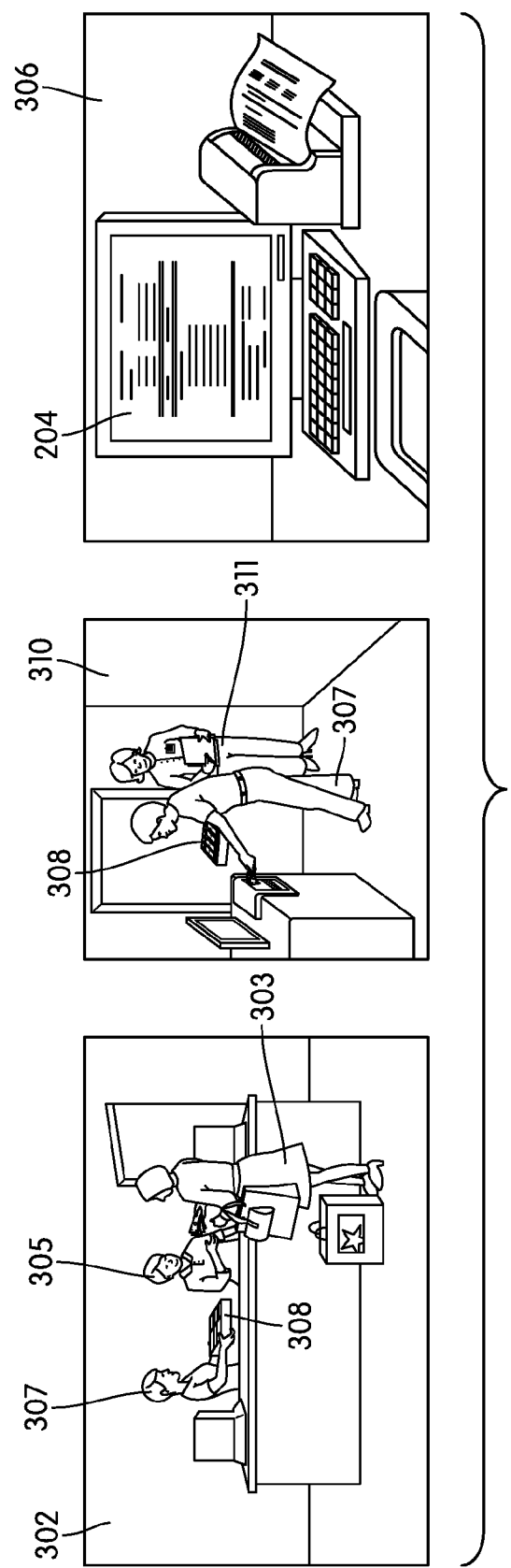
FIG. 3 illustrates various features of a currency recycler that may be used in accordance with aspects of the invention.

FIG. 3 illustrates various features of cash recycler 102 used in various aspects of the invention. The images in FIG. 3 depict use of a single cash recycler 102 in a retail environment. The retail owner may have a cash recycler 102 located in each of their stores. In an aspect of the invention, summary information for the retail owner's stores may be available via an interface to the financial institution. In another embodiment, access to summary information may be available directly from each of the cash recyclers 102.

In FIG. 3, image 302 depicts customer 303 paying cash to store cashier 305 for a purchase. Another store cashier 307 at a recently closed cash register may be carrying a cash drawer or till 308 to a back office for reconciliation. In image 310, store cashier 307 may load currency from cash register till 308 into cash recycler 102. In addition, store cashier 107 may also deposit other paper forms of payment received from customer such as checks. An office manager 311 may be supervising cashier 307 during the loading of cash register till 308 into cash recycler 102. Moreover, upon the start of a shift a cashier may fill his/her cash register till with a designated amount of currency dispensed from cash recycler 102.

In image 306 of FIG. 3, a display screen 204 of cash recycler 102 may show the total amount entered into cash recycler 102 from till 308. The display screen 204 may breakout the amount entered into cash recycler 102 by denomination and by each cashier. The total amount deposited and withdrawn from cash recycler 102 may be shown on display screen 204. Currency recyclers and recycling management are further described in U.S. application Ser. No. 11/614,656, entitled "Commercial Currency Handling and Servicing Management," filed on Dec. 21, 2006, the content of which is incorporated herein by reference in its entirety.

Figure 4:
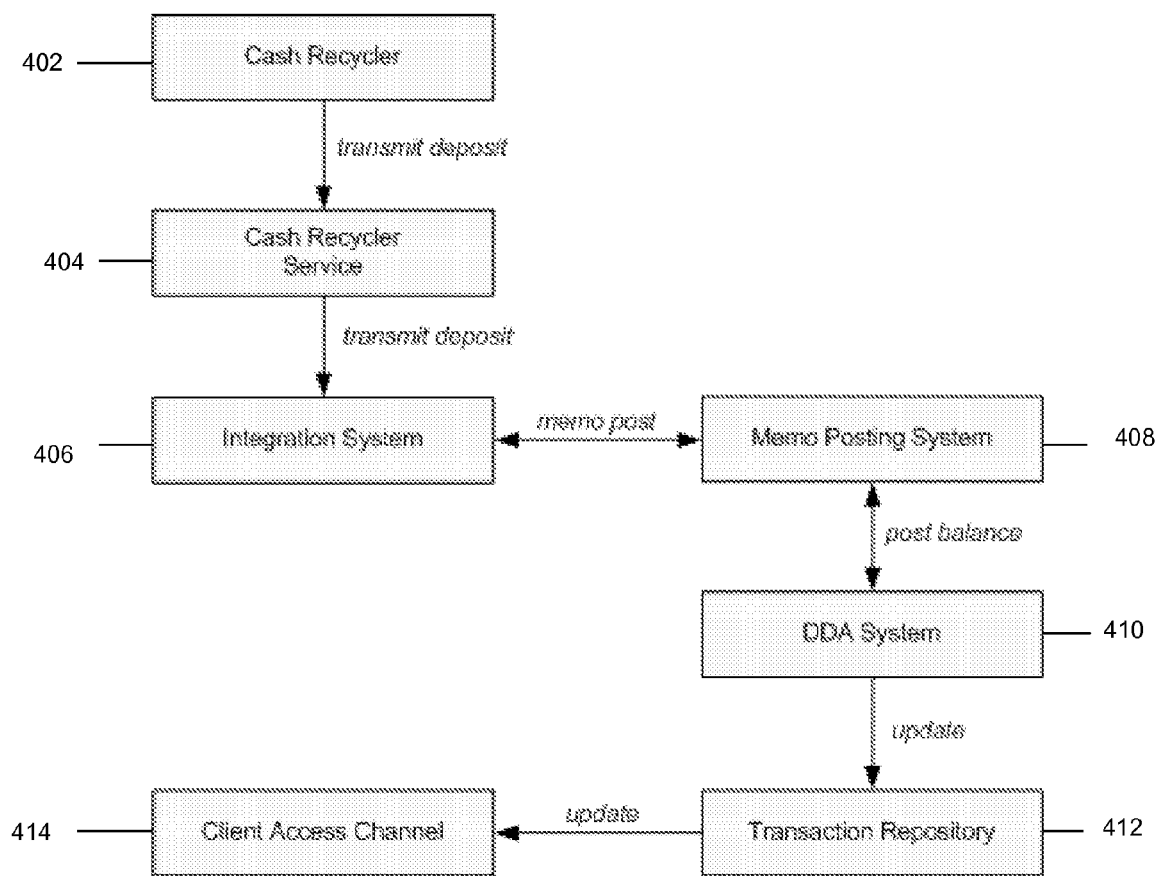
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

Figure 5:
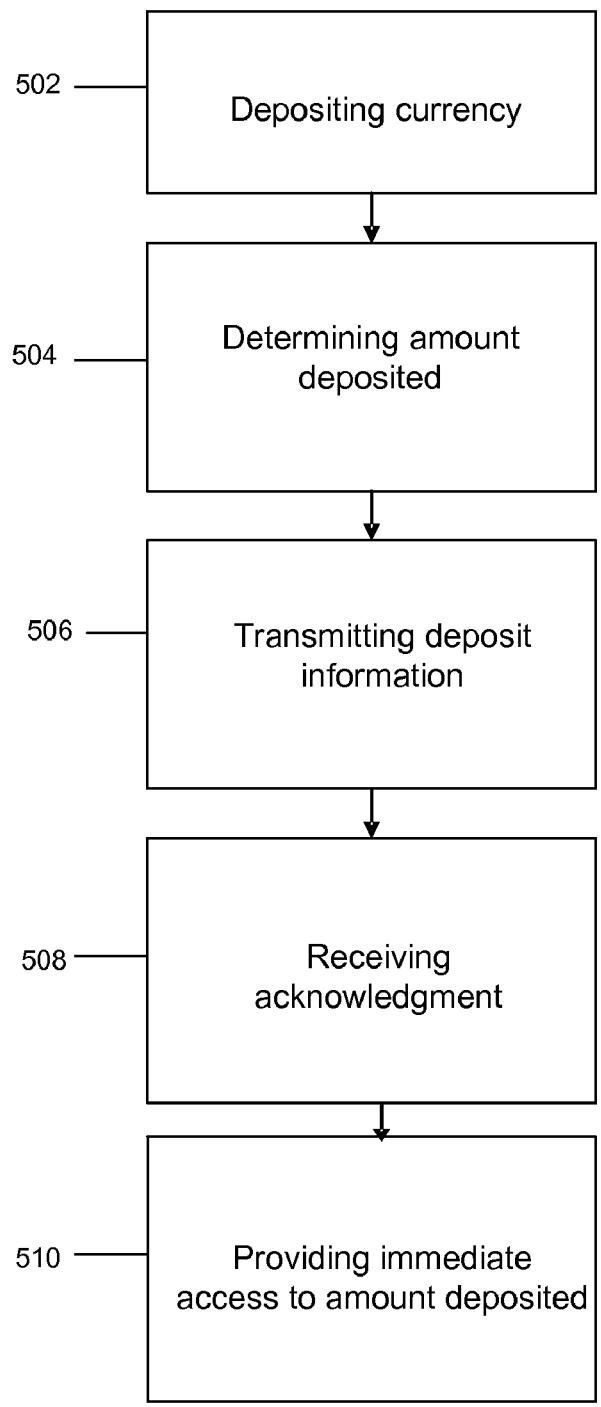
FIG. 5 illustrates a method of providing immediate availability to amount deposited in accordance with an aspect of the invention.

FIG. 5 illustrates a method of providing immediate access to an amount deposited in accordance with an aspect of the invention. In step 502, an enterprise employee may deposit a first amount of currency in a cash recycler. The cash recycler may accept different forms of currency including bills, coins, and checks. The cash recycler in step 504 may determine the amount of currency deposited by the enterprise employee. The cash recycler may query the enterprise employee to acknowledge the determined amount of currency to be deposited before proceeding. In step 506, the cash recycler may transmit information relating to the amount of currency deposited to a financial institution. The financial institution upon receipt of the transmitted information may access the account of the enterprise and update the balance by the amount of the deposit. The financial institution may transmit an acknowledgement that the enterprise account has been updated. In step 508, the cash recycler may receive an acknowledgement of the deposit. In step 510, the enterprise may have immediate availability to the amount deposited to the account.

Figure 6:
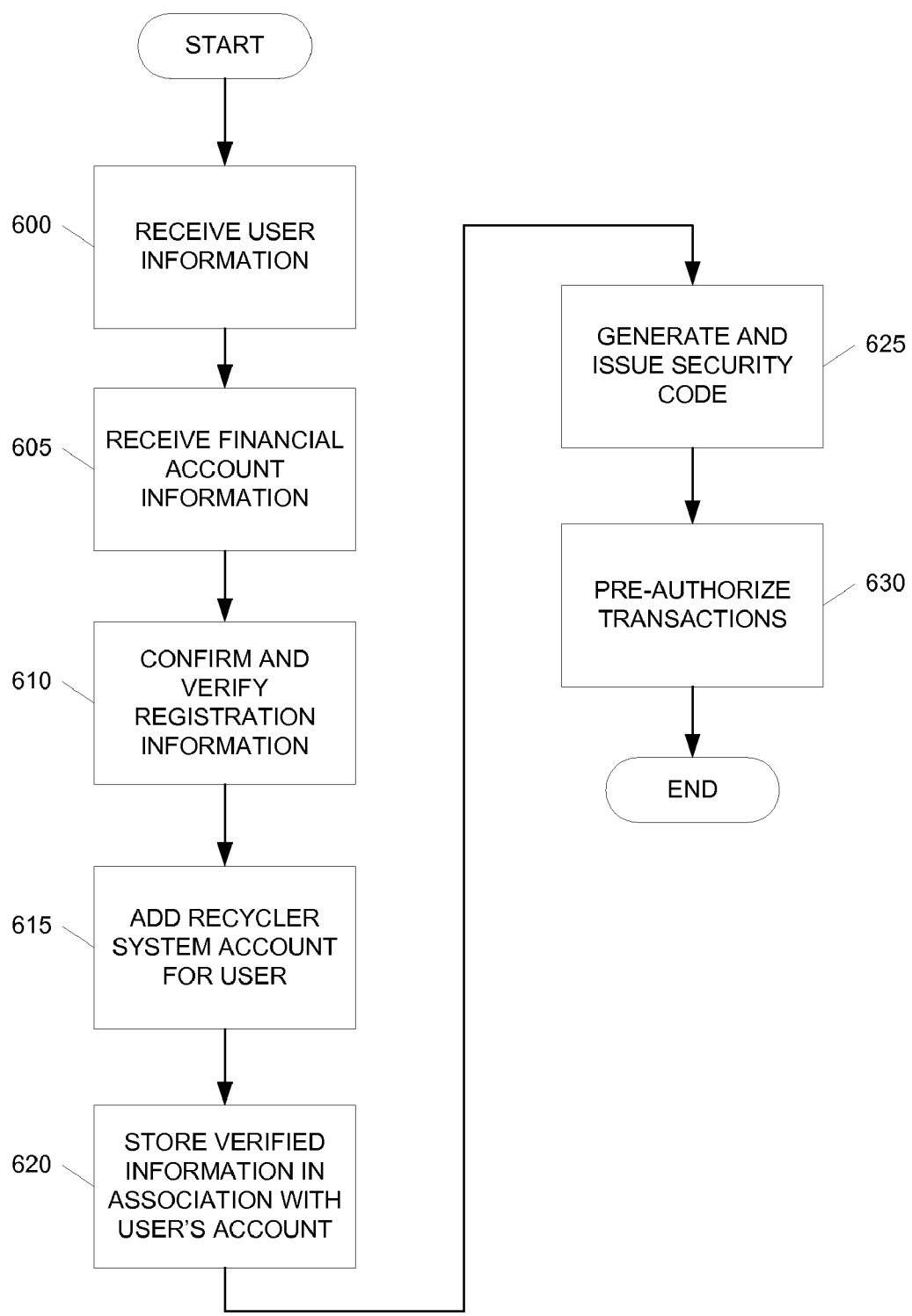
FIG. 6 illustrates a method for registering a user in a recycler system according to one or more aspects described herein.

FIG. 6 illustrates a method for registering a user and one or more accounts with a recycler system. A user and the user's account(s) may need to be registered with the system to insure that only authorized users and authorized accounts are used in conjunction with the recycler system. In addition, transactions with accounts to which funds are to be deposited may be pre-authorized so that deposited funds may be made immediately available to the depositing user. Accordingly, in step 600, a recycler system or recycler servicing system may receive user specific information including personal data such as a name, address, employee number, e-mail address and phone number. In step 605, the recycler or recycler servicing system may receive information identifying financial accounts such as checking, savings, credit card and/or debit card accounts associated with the registering user. In step 610, the recycler system or servicing system may confirm and verify the registration information. For example, the ownership and existence of accounts may be checked by requesting confirmation from the holding financial institution. Additionally, the information associated with the specified accounts may be compared to the personal information entered by the user to insure that the account belongs to the user.

Upon confirming and verifying the registration information, the recycler or recycler servicing system may then add the user to a database of user profiles or accounts in step 615. In addition, verified account information may be stored in association with the user profiles in step 620. In step 625, a security code or personal identification number (PIN) may be generated and issued to the registering user. The code or PIN may be intended only for the registering user's knowledge as a way to verify the user's identity when the user operates the recycling system. According to one or more aspects, a recycler or recycler servicing system may also pre-authorize transactions (e.g., transfers of funds) between the registering user's account and an account of the employer or business in step 630. Pre-authorization may involve establishing a level of trust and security between the two financial institutions and/or the two accounts. Once received, pre-authorization may allow transfers to occur in a shorter amount of time by bypassing more formal funds transfer requirements.

Figure 7:
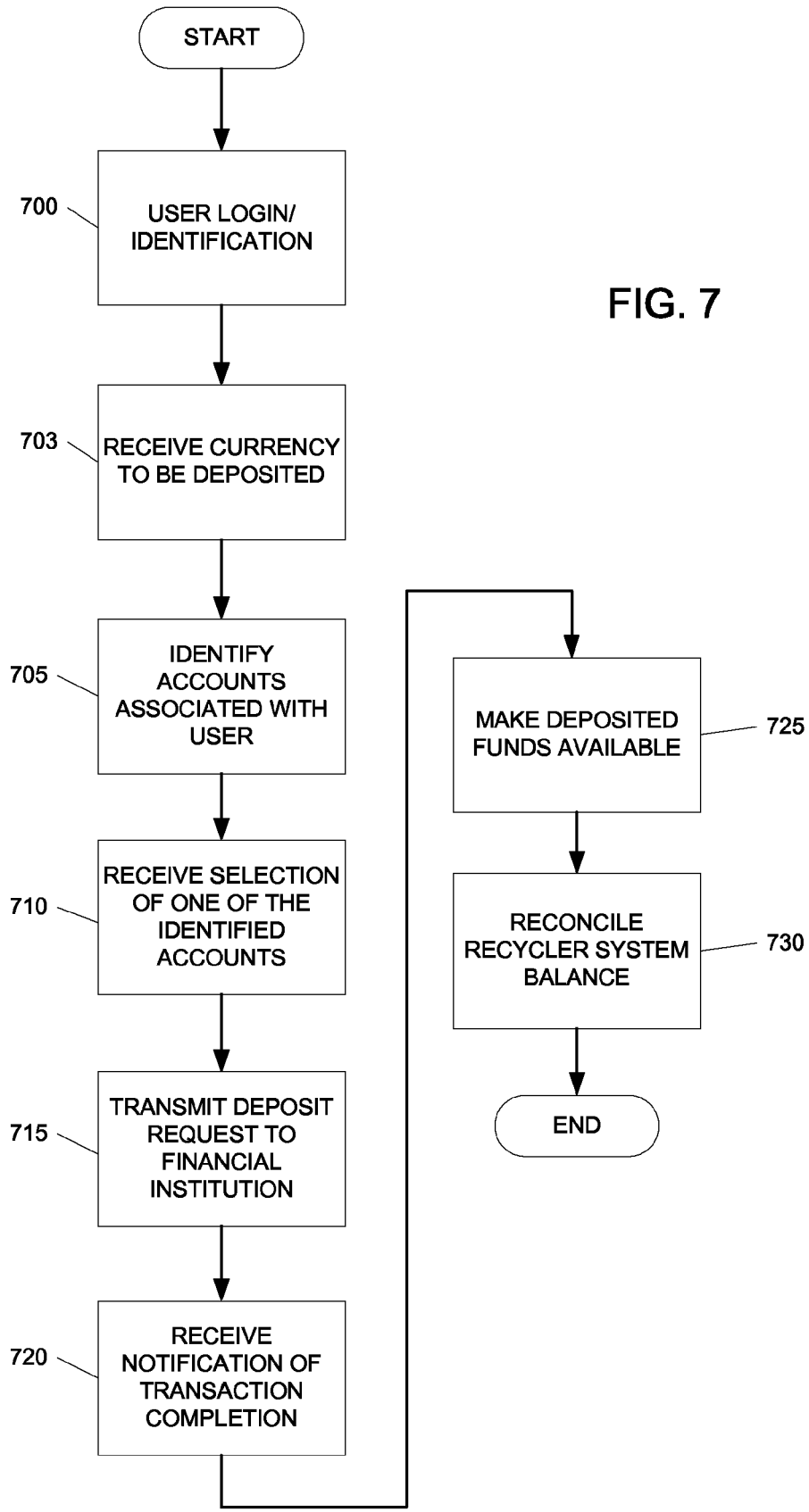
FIG. 7 illustrates a method for receiving currency and depositing the currency in a user account according to one or more aspects described herein.

FIG. 7 illustrates a method for distributing currency from a business's cash recycler to an account of an employee of the business. One scenario in which such a method may be used is when a retail employee wishes to transfer all or some of her tips onto a debit card, pre-paid cash card or mobility device for easier or safer transport. A mobility device or mobile payment device may include a variety of payment mechanisms including mobile phones, personal data assistants (PDAs) and the like. Thus, in step 700, the user may log in or otherwise identify herself to the currency recycler system. Once the user has been identified, the cash recycler system may receive an amount of currency that corresponds to at least the amount the user desires to transfer to his or her debit card, pre-paid card, mobility device or other account in step 703. As discussed, currency inserted into the system may be scanned for value and to identify counterfeit currency. In step 705, the cash recycler system may identify one or more accounts associated with the user to which the inserted currency may be deposited. Various types of accounts may include a savings account, a checking account, a gift card account, a debit card account, mobility device and the like. Accounts may be linked or otherwise associated with an employee or user using a database as discussed above.

In step 710, the cash recycler system may receive a selection of an account to which the inserted currency is to be deposited. Once the deposit account has been selected, the cash recycler system may transmit the deposit request to the business's banking institution to facilitate and complete the transfer of funds in step 715. For example, the recycler system may communicate with a recycling service system (e.g., system 404 of FIG. 4) at the business's banking institution to initiate and complete a funds transfer to the employee's selected account. The receiving account may be pre-registered as an authorized or trusted transfer account (Step 630 of FIG. 6) so that the funds transfer may be completed in a shorter amount of time and/or the transferred funds may be made available more quickly. Once the transfer has been authorized and completed, the recycler system may be notified in step 720. Further, the recycler system may begin allowing the use of the deposited currency in step 725 by making the funds available for withdrawal. On occasion (periodically or aperiodically) the recycler system may also reconcile the system balance with the financial institution's balance in step 730. For example, at the end of each day, the recycler system of a business may upload the balance in the machine to the bank, which then registers that amount (or a portion thereof) as a deposit to the business's account.

In one or more arrangements, a user wishing to deposit funds onto a pre-paid or debit card, or mobility device may select a receiving account by inserting a corresponding card, registering a mobility device, or entering an account number and/or personal identification number (PIN). For example, a user may swipe his or her cell phone near an RFID scanner to identify an account to the recycler system. Thus, the recycler system might not require a priori knowledge of the receiving account prior to the user initiating and making a deposit.

Figure 8C:
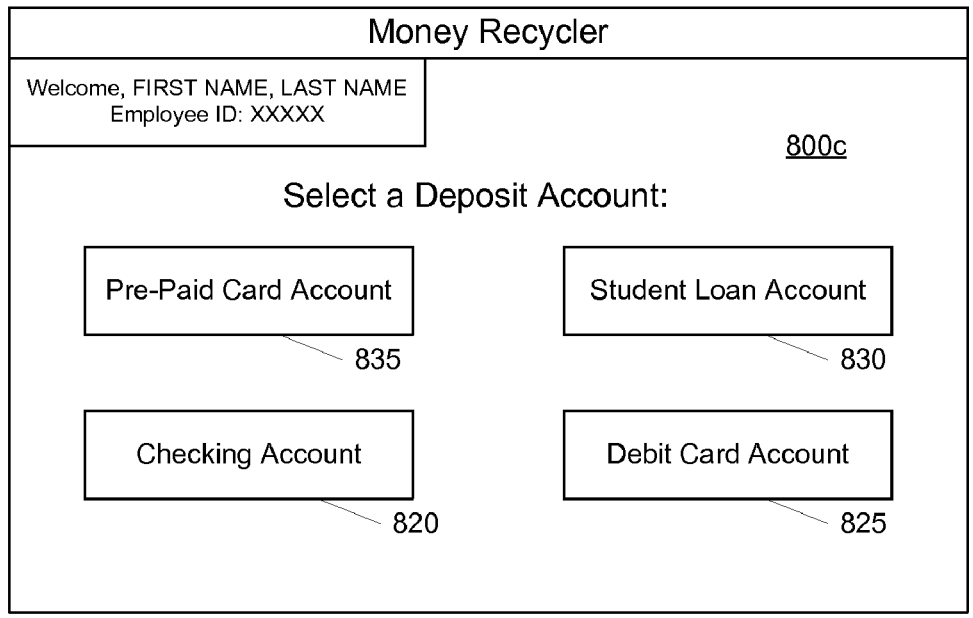
Figure 8D:
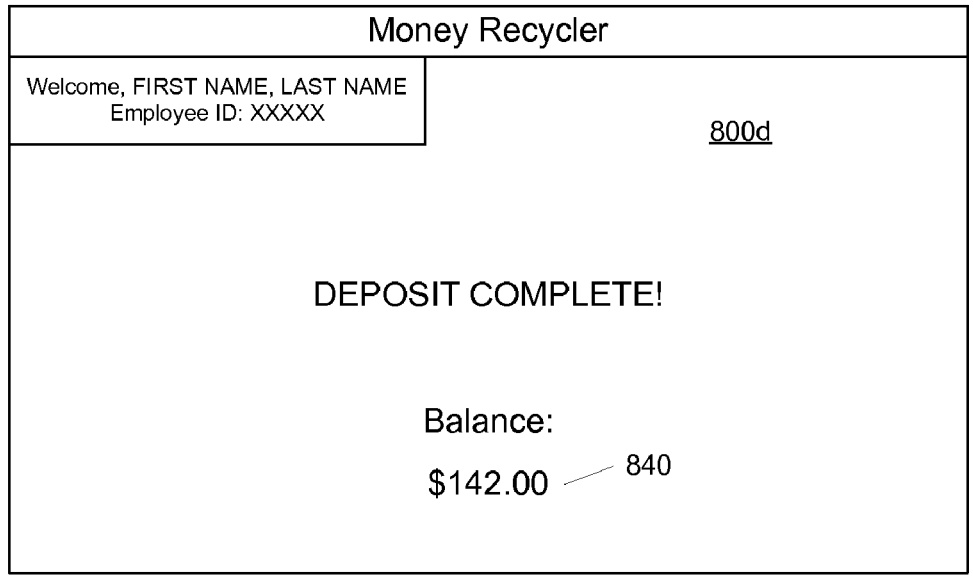

FIGS. 8A-8D illustrate user interfaces through which an employee or another user may make a deposit. In FIG. 8A, interface 800*a* may display a welcome message followed by a request to enter an identification number, e.g., in field 801, or to insert an identification device such as an employee or pre-paid card. An identification number may, for example, correspond to an employee number or may correspond to a bank account associated with the employee. FIG. 8B illustrates an interface 800*b* for requesting insertion of currency upon the user identifying herself by inserting an identification device or entering an identification number through interface 800*a*. Currency counter field 805 may keep track of an amount of money that has been inserted by the user. Identification information such as a name and employee number may also be provided in information box 810. Complete option 815 allows a user to indicate that she has finished inserting currency and is ready to proceed to the next step.

FIG. 8C illustrates an interface for selecting a deposit account for the inserted currency. For example, interface 800*c* may list bank account 820, debit card account 825, student loan payment account 830 and pre-paid account 835. In one or more arrangements, interface 800*c* may further display the balances (not shown) associated with each of accounts 820-835. Once an account has been selected, interface 800*d* of FIG. 8D may be displayed to confirm that the transfer has been completed. Additionally, a new balance for the selected account may also be displayed in balance field 840.

Figure 9:
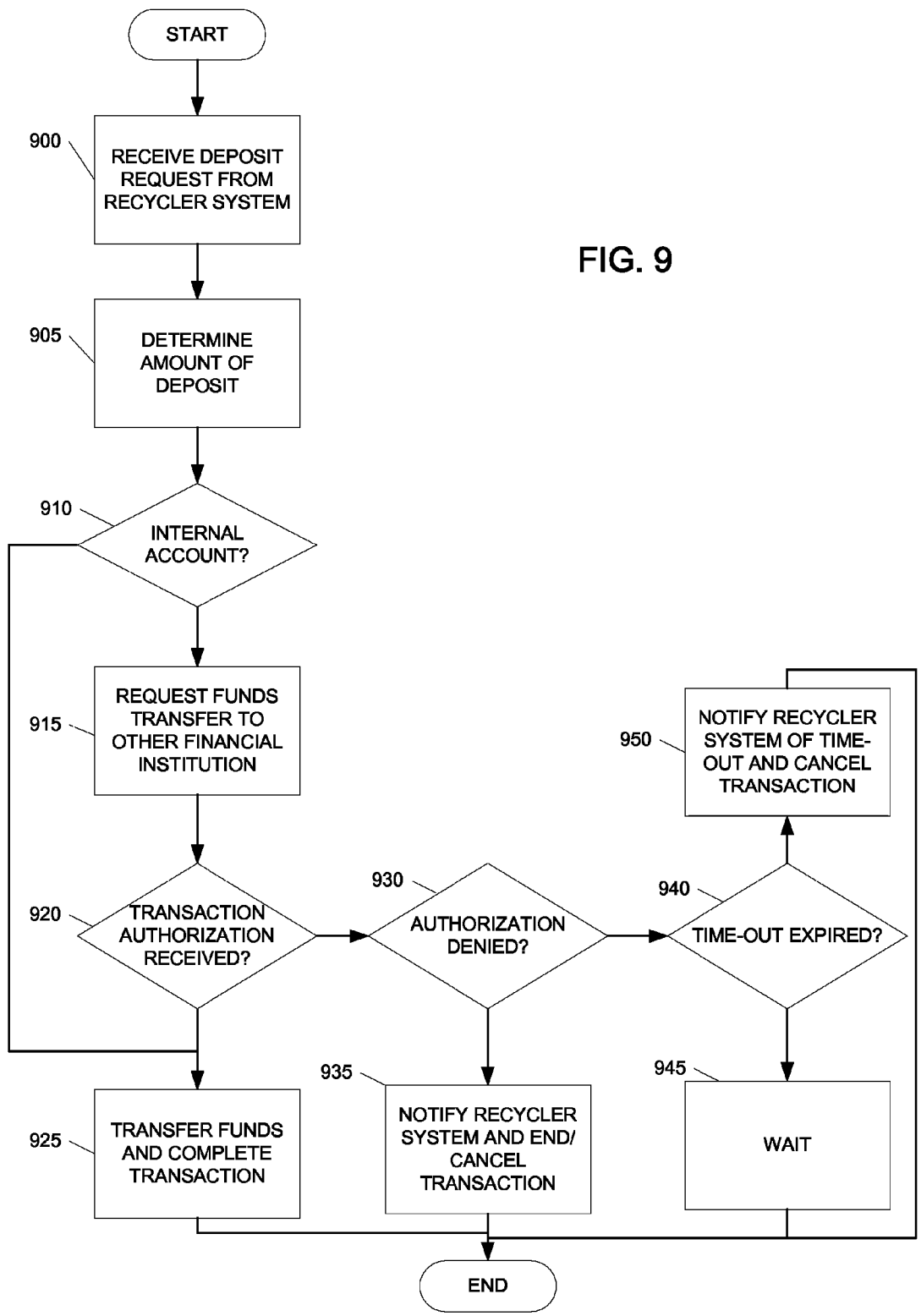
FIG. 9 illustrates a method for processing a deposit request received from a recycler system according to one or more aspects described herein.

FIG. 9 is a flowchart illustrating a method for processing a deposit request from a recycler system at a retail establishment or other business. In step 900, a financial institution associated with a recycler system may receive a deposit request from the recycler system. The request may be received by one or more systems at the financial institution including, e.g., a recycler service system and one or more server (e.g., server 231 of FIG. 2). The deposit request may correspond to a user's request to deposit funds into a specified account. In step 905, the financial institution may determine the amount of the deposit. In step 910, the financial institution may determine whether the specified account is an internal account. That is, the financial institution may determine whether the specified account is maintained or held by the financial institution. If so, in step 925, the financial institution may transfer the deposited amount of currency between accounts within the financial institution and complete the transaction. If, however, the specified account is held or backed by a different financial institution, the financial institution may initiate a request to transfer funds to the financial institution associated with the specified account in step 915.

In response to the request, the originating financial institution may determine whether authorization has been received for the requested transfer in step 920. If authorization has been received, the system transfers the funds and completes the transaction in step 925. The originating financial institution may further notify the recycler system that the transaction was completed. If, however, authorization is not received for the requested transfer, the originating financial institution may determine whether the transaction request has been denied in step 930. If the transaction request has been denied, the originating financial institution may notify the recycler system and end the transaction in step 935. If, however, authorization has not been received and the transaction request has not been denied, the originating financial institution may determine whether a time-out period has expired in step 940. That is, the originating financial institution may determine whether it has waited a sufficient amount of time for a response. If not, the originating institution may continue to wait or enter a wait mode in step 945. The time-out period may be based on the requested type of transaction or may be a standard wait time for all transactions. If the time-out period has expired, the originating financial institution may indicate that the transaction timed-out and cancel the transaction request in step 950. If a transaction request does not receive authorization, either because authorization was denied or no response was received, a user may try again at a later time.

In addition to depositing currency into a savings account, a debit card account, or a mobility device as discussed herein, currency deposited into a recycler system may also be used to make payments to various other accounts. For example, a user may direct the recycler system to transfer an amount deposited to pay off a credit card balance. In another example, a user may deposit money into a recycler system to pay a student loan balance or a portion thereof. Bills such as electric/utility bills, television bills, phone bills and the like may also be paid in a similar manner. In some instances, a recycler system or financial institution associated therewith may provide a financial benefit (e.g., adding 1% to a payment) if bill payments are performed through the recycler system. A financial institution may promote such payment features to motivate customers to use the recycler system. Alternatively or additionally, cash payroll disbursements may be deposited directly into an employee's account by using the recycler system.

In one or more aspects described herein, depositing cash by an employee or associate into the employee or associate's account may represent an outbound cash flow or withdrawal of funds from the business or employer. For example, if an employee is given their monthly pay in the form of cash and the employee deposits the cash into his or her account through a recycler system, the deposit may represent a withdrawal of the deposited funds from the employer's account(s).

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method of currency handling, comprising:
   receiving an amount of currency by a currency recycler system located at a place of business, wherein the currency recycler system stores currency for the place of business, wherein financial account information of at least one employee of the place of business is pre-registered with the currency recycler system, and wherein the received amount of currency includes at least one physical currency note;
   determining, by the currency recycler system, the amount of currency received;
   receiving, by the currency recycler system, input specifying an account of an employee of the place of business to which the currency is to be deposited, wherein at least a portion of the stored financial account information corresponds to the specified account and wherein the specified account belongs to the employee;
   electronically transmitting a request, to a financial institution different from the place of business, to transfer the received amount of currency from an account of the place of business to the specified account of the employee, wherein the request includes the at least a portion of the pre-registered financial account information, wherein the account of the place of business is held by the financial institution and the specified account of the employee is held by one of: the financial institution and another financial institution different from the place of business;
   receiving, by the currency recycler system, an acknowledgement that the amount deposited has been added to the specified account;
   providing, by the currency recycler system, physical withdrawal access to the at least one physical currency note from the currency stored for the place of business at the currency recycler system; and
   electronically requesting, by the currency recycler system, a deposit of the amount of currency received to the account of the place of business.

2. The method of claim 1, wherein the specified account corresponds to a pre-paid cash card.

3. The method of claim 1, further comprising:
   receiving a request for depositing the amount of currency into the currency recycler system from the employee;
   retrieving, by the currency recycler system, stored financial account information corresponding to a plurality of financial accounts of the employee, the plurality of financial accounts being pre-registered with the currency recycler system; and
   generating a display, by the currency recycler system, of a menu of accounts for depositing the amount of currency using the stored financial account information corresponding to the accounts of the employee.

4. The method of claim 1, wherein the method further comprises determining if any of the currency deposited in the machine includes counterfeit currency.

5. The method of claim 1, wherein requesting deposit of the amount of currency received to the account of the place of business is performed based on a predefined schedule.

6. The method of claim 1, further comprising reconciling a balance of the currency recycler system with a remote financial institution.

7. A method comprising:
   receiving, at a currency recycler system located at a business, a request to deposit an amount of currency into a specified account of an employee of the business, wherein the currency recycler system stores funds for the business and stores financial account information of the employee, the financial account information being pre-registered with the currency recycler system, and wherein the amount of currency includes at least one physical currency note deposited into the currency recycler system;
   receiving a selection of an account of the employee to which to deposit the amount of currency, wherein the selected account belongs to the employee;
   transmitting the deposit request to a remote recycler servicing system of a financial institution different from the place of business through a network, wherein the deposit request includes a request to transfer the amount of currency from an account of the business to the selected account of the employee and at least a portion of the stored pre-registered financial account information corresponding to the selected account, wherein the account of the place of business is held by the financial institution and the selected account of the employee is held by one of: the financial institution and another financial institution different from the place of business;

receiving, at the currency recycler system, confirmation that the amount of currency was deposited into the specified account in response to the deposit request; and providing, at the currency recycler system, physical withdrawal access to the at least one physical currency note of the received currency from the currency recycler system.

8. The method of claim 7, wherein the specified account corresponds to a pre-paid cash card.

9. The method of claim 8, further comprising verifying the authenticity of the received currency.

10. The method of claim 7, further comprising:
receiving a request for depositing the amount of currency into the currency recycler system from the employee;
retrieving, by the currency recycler system, stored financial account information corresponding to a plurality of accounts of the employee, the plurality of financial accounts being pre-registered with the currency recycler system; and
generating a display, by the currency recycler system, of a menu of accounts for depositing the amount of currency using the stored financial account information corresponding to the accounts of the employee.

11. The method of claim 7, wherein receiving the request to deposit the amount of currency includes receiving the amount of currency at the currency recycler system.

12. One or more non-transitory computer readable media storing computer readable instructions that, when executed, cause a currency recycler system to:
receive an amount of currency at the currency recycler system, wherein the currency recycler system is located at a place of business and wherein the currency recycler system stores currency for the business and financial account information of at least one employee of the business, wherein the financial account information is pre-registered with the currency recycler system and wherein the received amount of currency includes at least one physical currency note;
determining the amount of currency received in the currency recycler system;
receiving input specifying an account of an employee of the place of business to which the amount of currency is to be deposited, wherein at least a portion of the stored financial account information corresponds to the specified account and wherein the specified account belongs to the employee;
electronically transmitting a request, to a financial institution different from the place of business, to transfer the received amount of currency from an account of the place of business to the specified account, wherein the request includes the at least a portion of the stored pre-registered financial account information, wherein the account of the place of business is held by the financial institution and the specified account of the employee is held by one of: the financial institution and another financial institution different from the place of business;
receiving an acknowledgement that the deposited amount of currency has been added to the specified account of the employee; and
providing physical withdrawal access of the at least one physical currency note of the received amount of currency from the currency recycler system.

13. The one or more computer readable media of claim 12, wherein the specified account corresponds to a pre-paid cash card.

14. The one or more computer readable media of claim 13, further comprising instructions for:
receiving a request for depositing the amount of currency into the currency recycler system from the employee;
retrieving, by the currency recycler system, stored financial account information corresponding to a plurality of financial accounts of the employee, the plurality of financial accounts being pre-registered with the currency recycler system; and
generating a display, by the currency recycler system, of a menu of accounts for depositing the amount of currency using the stored financial account information corresponding to the accounts of the employee.

15. The one or more computer readable media of claim 12, further comprising instructions for determining if any of the currency deposited in the currency recycler system includes counterfeit currency.

16. The one or more computer readable media of claim 12, further comprising instructions for:
requesting deposit of the received amount of currency to the account of the place of business at a predefined time.

17. The one or more computer readable media of claim 12, further comprising instructions for reconciling a balance of the currency recycler system with a remote financial institution.

18. The one or more computer readable media of claim 12, further comprising instructions for registering the employee in the recycler system, wherein registering the employee includes pre-authorizing transactions with the one of: the financial institution and the other financial institution holding the specified accounts of the employee.

* * * * *